Dec. 15, 1959　　F. W. CUNNINGHAM　　2,916,931
MOTOR CONTROL SYSTEM FOR AUTOMATIC MACHINE TOOLS
Original Filed Aug. 2, 1951
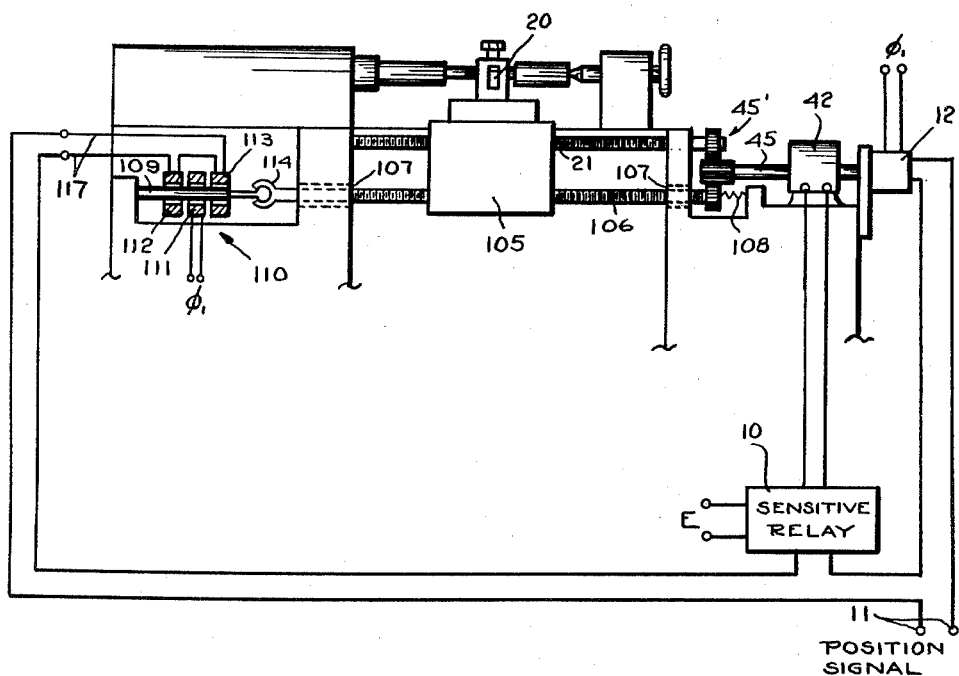
INVENTOR.
FREDERICK W. CUNNINGHAM
BY
Raymond A. Paquin
ATTORNEY.

United States Patent Office 2,916,931
Patented Dec. 15, 1959

2,916,931

MOTOR CONTROL SYSTEM FOR AUTOMATIC MACHINE TOOLS

Frederick W. Cunningham, Stamford, Conn., assignor to American Bosch Arma Corporation, a corporation of New York Original application August 2, 1951, Serial No. 240,018, now Patent No. 2,741,732, dated April 10, 1956. Divided and this application February 28, 1956, Serial No. 568,288

7 Claims. (Cl. 74—409)

The present invention relates to machine tools and has reference to means for automatically controlling the machine tools from a punched tape or the like; and particular reference to backlash compensating means therefor.

This application is a division of my application Serial No. 240,018, filed August 2, 1951, now Patent Number 2,741,732.

The backlash compensator of this invention is particularly useful in automation of machine tools where the operation of the machine tool is controlled by a voltage proportional in magnitude to the desired displacement of the tool from the defined zero position. In the usual machine tool a carriage for the tool or work is driven through a drive screw by some motive means, which for automation, is controlled according to the error between the desired position and the present position of the carriage. The indicated present position, when measured by the number of turns made by the drive screw, may not be the actual position, however, due to backlash between the drive screw and the carriage.

For additional accuracy a loss-motion-compensator is installed to compensate for backlash in the drive screw.

The backlash compensator includes a measuring screw which is driven by the lead screw and is resiliently urged against the tool carriage. The carriage position is then measured by rotational displacement and the longitudinal displacement of the measuring screw.

For a more complete understanding of the present invention reference may be had to the accompanying diagram, in which The figure is a schematic view showing the loss-motion-compensator applied to a machine tool.

The machine tool control may be of the type fully described in U.S. Patent 2,741,732, and which essentially comprises a phase sensitive relay 10 responsive to the error between an electrical signal at terminals 11, which is proportional to a desired displacement of the tool 20 or the carriage 105 from a reference position, and a signal indicative of the present position of the carriage. The present position signal may be obtained from the potentiometer 12 which is energized by a constant voltage and whose movable member is driven by motor 42 which also drives the lead screw 21. The difference or error signal operates the relay to apply a voltage of the correct sign and chosen magnitude (as input voltage E, for example) to the motor 42 and thereby causes motor 42 to drive the carriage 105 toward the desired position. When the error signal is zero, the lead screw should have driven the carriage to the position indicated by the output of potentiometer 12. Usually, however, there is backlash between the drive screw 21 and the carriage 105 which causes a difference in the actual position of the carriage and its indicated position.

For more accurate results in positioning the tool 20, the machine tool is equipped with the lost-motion-compensator which will be described with reference to an automatic lathe, such as shown in the drawing, and includes the pickoff device 110 and the measuring screw 106.

The lost-motion-compensator is a means of electrically compensating for the backlash between the lead screw 21 and the tool 20.

The tool 20 is driven by means of the lead screw 21 which is threaded in the carriage 105 and is driven by output shaft 45 of motor 42. Gearing 45' causes lead screw 21 to drive a similar metering screw 106 which is also threaded in carriage 105 but is free to slide longitudinally within its bearings 107 and is always urged to the right by spring 108. The left hand end of metering screw 106 carries a ball and knuckle joint 114 to which is connected the armature 109 of the linear pickoff device 110.

It is evident that with any appreciable backlash between the drive screw 21 and carriage 105 the position of tool 20 cannot be accurately determined by the angular displacement of screw 21. Also, it should be noted that with metering screw 106 always urged to the right by spring 108, the metering screw 106 will experience longitudinal displacement during the lost motion period of screw 21. Thus the position of tool 20 is accurately determinable from the angular displacement plus the longitudinal displacement of metering screw 106, and conversely the error in the position of tool 20 as determined from angular displacement of screw 21 alone is equal to the longitudinal displacement of metering screw 106. The pickoff device 110 is preferably of the differential transformer type where the primary winding 111 is energized by $\phi$, and the secondary windings 112 and 113 are connected in series opposition so that the magnitude of the voltage across the output leads 117 is proportional to the longitudinal displacement of the armature 109 from the defined zero position. Leads 117 are connected in series with the potentiometer 12, terminals 11 and the terminals of relay 10 so that the voltage to relay 10 is the difference between the input signal at terminals 11 and the sum of the outputs of potentiometer 12 and the linear pickoff 110. Thus, when the relay 10 is deenergized, the position of the tool 20 is proportional to the sum of the angular displacement of screw 21 plus the longitudinal displacement of screw 106.

Although this specification has described the automatic tool control with reference to an engine lathe, the invention is not to be restricted to such use but may be applied with equal facility to other machine tools, such as milling machines and jigborers, for example.

I claim:

1. In a device of the character described, motive means, a driven member operatively connected to said motive means, a screw threaded in said driven member, means urging said screw axially, means operatively connecting said motive means and said screw for driving said screw, means operatively connected to said screw and responsive to linear motion thereof and means for effecting the energization of said motive means by said means operatively connected to said screw.

2. In a device of the character described, motive means, a driven member, operative connections between said motive means and said driven member, a precision screw in said member, spring means urging said screw axially, means for driving said screw, linear means operatively connected to said screw responsive to linear motion thereof, and means for energizing said motive means by said means operatively connected to said screw.

3. In a backlash eliminator of the type described, driving means having an output shaft, a driven member, operative connections between said output shaft and said driven member for driving said member, control means connected to said operative connections and adapted to control said driving means to drive said output shaft to a predetermined position, said control means comprising a precision screw in said driven member, spring means operatively connected to said screw to urge said screw axially in said driven member, means for driving said screw in synchronism with said output shaft, and means actuated by the linear displacement of said screw and adapted to modify the operation of said control means and to modify the position of said output shaft accordingly.

4. In a backlash eliminator of the type described, driving means having an output shaft, a driven member, operative connections between said output shaft and said driven member for driving said member, control means connected to said operative connections and adapted to control said driving means to drive said output shaft to a predetermined position, said control means comprising a precision screw in said driven member, spring means operatively connected to said screw to urge said screw axially in said driven member, means for driving said screw in synchronism with said output shaft, and means for energizing said driving means to correct the position of said driven member by compensating for backlash between said driven member and said output shaft.

5. In a backlash eliminator of the type described, driving means having an output shaft, a driven member, operative connections between said output shaft and said driven member for driving said member, control means connected to said operative connections and adapted to control said driving means to drive said output shaft to a predetermined position, said control means comprising a precision screw in said driven member, spring means operatively connected to said screw to urge said screw axially in said driven member, means for driving said screw in synchronism with said output shaft, and means for energizing said driving means to correct the position of said driven member by compensating for backlash between said driven member and said output shaft, said means comprising signal means operatively connected to said screw and actuated by linear displacement of said screw and adapted to effect actuation of said driving means according to said displacement to thereby reduce said displacement.

6. In a backlash eliminator of the type described, driving means having an output shaft, a driven member, operative connections between said output shaft and said driven member for driving said member, control means connected to said operative connections and adapted to control said driving means to drive said output shaft to a predetermined position, said control means comprising a precision screw in said driven member, spring means operatively connected to said screw to urge said screw axially in said driven member, means for driving said screw in synchronism with said output shaft, means actuated by the linear displacement of said screw and adapted to modify the operation of said control means and to modify the position of said output shaft accordingly, said means comprising signal means operatively connected to said screw and actuated by linear displacement of said screw and adapted to effect actuation of said driving means according to said displacement to thereby reduce said displacement.

7. In a backlash eliminator of the type described, driving means having an output shaft, a driven member, operative connections between said output shaft and said driven member for driving said member control means connected to said operative connections and adapted to control said driving means to drive said output shaft to a predetermined position, said control means comprising a precision screw in said driven member, spring means operatively connected to said screw to urge said screw axially in said driven member, means for driving said screw in synchronism with said output shaft, and means for energizing said driving means to correct the position of said driven member by compensating for backlash between said driven member and said output shaft, said means comprising linear pickoff signal means operatively connected to said screw and actuated by linear displacement of said screw and adapted to effect actuation of said driving means according to said displacement to thereby reduce displacement.

References Cited in the file of this patent

UNITED STATES PATENTS

| | | |
|---|---|---|
| 2,561,346 | De Vlieg | July 24, 1951 |
| 2,748,665 | Senn | June 5, 1956 |